VOLTAGE SUPPLY

Filed May 22, 1968

INVENTOR
WOLFGANG F. W. DIETZ
BY Kenneth R. Schaefer
Attorney

United States Patent Office 3,495,126
Patented Feb. 10, 1970

3,495,126
VOLTAGE SUPPLY
Wolfgang F. W. Dietz, Indianapolis, Ind., assignor to RCA Corporation, a corporation of Delaware
Filed May 22, 1968, Ser. No. 730,996
Int. Cl. H01j 29/56, 29/70; H05b 41/14
U.S. Cl. 315—31 15 Claims

ABSTRACT OF THE DISCLOSURE

A voltage supply suitable for use in the focus system of a color television receiver. A peak rectifier arrangement is coupled to the horizontal deflection output transformer and includes a resonant circuit for rendering the peak rectifier responsive to the second half of deflection retrace pulses. A low voltage control is coupled to the rectifier arrangement for adjustment of the focus voltage.

This invention relates generally to voltage supplies and more particularly to a voltage supply suitable for satisfying the focus voltage requirements of a cathode ray tube.

One application of such a focus voltage supply which is of particular interest is a shadow-mask type of color kinescope. The various aspects of the present invention therefore will be described in connection with such a display device as it is used in a color television receiver.

In the design of color television receivers, it is a customary practice to develop both the focus and final anode (ultor) supply voltages by rectification of flyback pulses produced in the horizontal deflection output transformer. Additionally, many color television receiver designs employ a shunt regulator coupled across the ultor voltage supply for maintaining the ultor voltage and the total load on the horizontal output transformer substantially constant as kinescope beam current (ultor load) varies. In such an arrangement, focus supply voltage also remains substantially constant. However, where regulating means other than the shunt regulator is employed or where high voltage is not regulated to a constant value as kinescope beam current varies, relative variations may occur between focus and ultor supply voltages which cause a departure from the desired ratio of the two voltages required for proper focusing of the kinescope beams. The resultant beam de-focusing causes a degradation in the quality of the reproduced image.

It is therefore desirable to maintain a substantially constant ratio between focus and ultor supply voltages in a television receiver. One method of obtaining such a result is described in a co-pending U.S. patent application Ser. No. 676,398, entitled, "Focus Voltage Supply" filed Oct. 19, 1967, now Patent No. 3,432,718, in the name of Joseph Preisig and assigned to the same assignee as the present invention. The present invention also provides the desired tracking of focus and ultor supply voltages. Furthermore, in accordance with the present invention, means are provided for controlling the amplitude of the focus supply voltage.

In a preferred embodiment of the invention, periodically recurring voltage pulses having a duration substantially equal to the retrace portion of a deflection cycle are developed across one or more portions of a transformer. First rectifying means is coupled to the transformer and is responsive to the voltage pulses for developing a unidirection voltage. Resonant circuit means comprising a capacitor and an inductor is coupled to the transformer and to the rectifying means for inhibiting conduction in the rectifying means during the first half of retrace. The resonant circuit is arranged to exhibit a natural resonant period fractionally greater than the retrace portion of the deflection cycle.

In accordance with a further aspect of the invention, a variable lower voltage supply is coupled to the rectifying means and serves to permit adjustment of the higher focus voltage.

The novel features that are considered characteristic of this invention are set forth with particularity in the appended claims. The invention itself, however, both as to its organization and method of operation as well as additional objects thereof will best be understood from the following description when read in connection with the accompanying drawing, in which:

Figures 1, 2A, 2B:
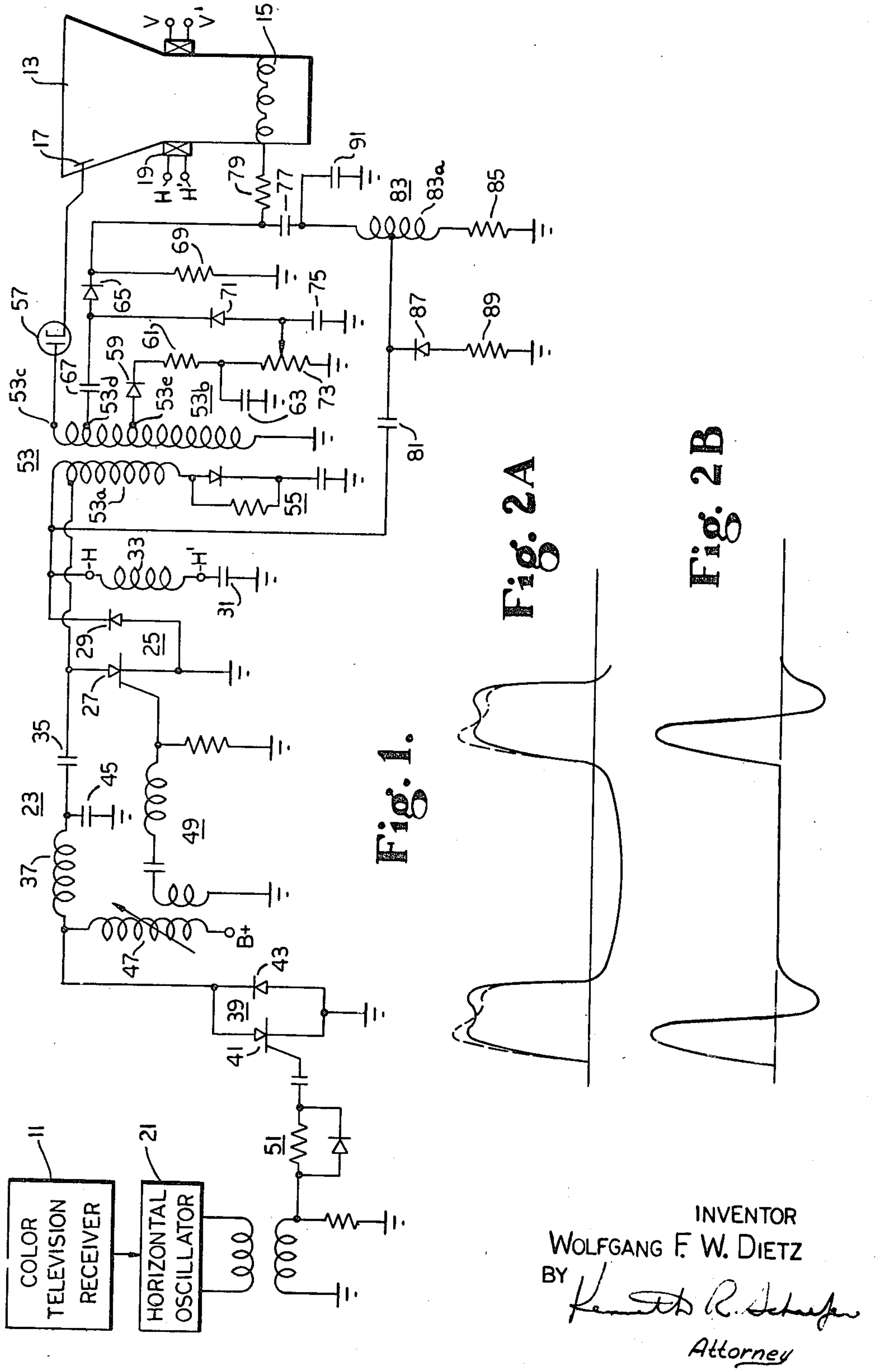
FIGURE 1 illustrates in block and schematic form a color television receiver including a focus voltage supply constructed in accordance with the present invention.
FIGURES 2A and 2B illustrates voltage waveforms (not drawn to scale) occurring in the circuit illustrated in FIGURE 1 during each line scanning interval.

In FIGURE 1, a color television receiver which may be of a generally conventional type is illustrated in block form, with, however, details of the horizontal output circuitry and associated voltage supplies shown schematically. In the typical receiver 11, a carrier wave modulated by composite color television signals is received by signal receiving apparatus which includes the usual RF tuner, frequency converting apparatus, IF amplifier and video detector. Video signals are recovered in the receiving apparatus from the modulated carrier and are amplified in a video amplifier. The amplified video signals are supplied to a keyed AGC circuit which controls amplifier gain in the signal receiving apparatus in accordance with conventional automatic gain control principles. The video signals also are applied to a luminance channel, to a chrominance channel and to a synchronizing signal separator. The chrominance channel processes the color information to a form suitable for application to a color image reproducer. A three-gun shadow mask color kinescope 13 serves as the color image reproducer of the illustrated receiver. The electrode structure of the color kinescope 13 includes respective red, green and blue cathodes; respective red, green and blue control grids; respective red, green and blue screen electrodes; (also known as first or accelerating anodes); a focusing electrode structure 15 and an ultor electrode (or final anode) 17. The target assembly of the color kinescope 13 comprises a phosphor screen composed of a regular array of red-, green- and blue-emitting phosphor dots and an associated perforated mask.

A deflection yoke 19 is associated with the color kinescope 13 and responds to respective vertical and horizontal deflection waves to cause the individual beams produced by color kinescope 13 to trace a raster on the phosphor screen. A convergence yoke (not shown) which responds to suitable dynamic convergence waveforms to cause the color kinescope beams to properly converge in the target region throughout the scanning of the raster is also customarily associated with kinescope 13.

The color signal outputs of the chrominance channel are applied individually to the respective control grids of the kinescope 13. The respective cathodes are driven by the output of the luminance channel which serves to amplify the luminance component of the composite signal and includes suitable delay apparatus to equalize the delay of the luminance component with the delay encountered by the chrominance information in the chrominance channel.

The output of the sync separator is supplied to the vertical deflection circuits and to a horizontal deflection oscillator 21. The vertical deflection circuits generate a vertical deflection wave for application to the terminals V, V' of the deflection yoke 19, under the control of vertical synchronizing pulses derived from the sync separator apparatus. The horizontal oscillator 21, which may be a conventional blocking oscillator, develops a periodic switching voltage under the control of horizontal synchronizing pulses derived from the sync separator apparatus. The oscillator 21 is associated with suitable deflection AFC apparatus (not shown) for assuring the desired synchronization.

The periodic switching voltage developed by oscillator 21 is applied to a horizontal deflection circuit indicated generally by the reference numeral 23.

Deflection circuit 23 is of the type shown and described in my U.S. patent application Ser. No. 721,383, filed Apr. 15, 1968, entitled "Electron Beam Deflection And High Voltage Generation Circuit," and assigned to the same assignee as the present invention. Briefly stated, deflection circuit 23 comprises a bilaterally conductive trace switching means 25 comprising a silicon controlled rectifier (SCR) 27 and a diode 29 for coupling a relatively large energy storage capacitor 31 across a horizontal deflection winding 33 during the trace portion of each deflection cycle. A first capacitor 35 and a commutating inductor 37 are coupled between trace switching means 25 and a bilaterally conductive commutating switch means 39, which comprises a silicon controlled rectifier 41 and a diode 43. A second capacitor 45 is coupled from the junction of capacitor 35 and commutating inductor 37 to ground. A voltage supply B+ is coupled to a relatively large supply inductor 47 which, in turn, is coupled to the junction of commutating inductor 37 and commutating switching means 39. Supply inductor 47 may be varied to compensate for line voltage variations in a manner described in my U.S. patent application Ser. No. 731,163, entitled "Voltage Regulator," filed concurrently herewith and assigned to the same assignee as the present invention.

First triggering means 49 is coupled from inductor 47 to SCR 27 for initiating conduction in SCR 27 during the trace portion of each deflection cycle. Second triggering means 51 is coupled from horizontal oscillator 21 to SCR 41 for initiating conduction therein near the end of the trace portion of each deflection cycle.

The primary winding **53*a* of a horizontal deflection output transformer 53 is coupled to trace switching means 25 and is returned to ground by means of a protection circuit 55**.

A secondary step-up winding **53*b* having a high voltage tap (terminal) 53*c*, a focus voltage tap 53*d* and a screen voltage tap 53*e* is returned to ground at its lower end. A high voltage rectifier 57 is coupled between high voltage tap 53C and the ultor electrode 17 of kinescope 13 for supplying a high beam accelerating voltage (e.g. of the order of 25,000 volts) to kinescope 13**.

A screen voltage supply comprising a rectifier 59, a series resistor 51 and a capacitor 63 is coupled between screen voltage tap **53*e*** and ground.

A focus voltage supply constructed in accordance with the present invention is coupled between focus voltage tap (terminal) **53*d* and focus electrode 15**.

In the focus voltage supply circuit, the anode of a first rectifier 65 is coupled by means of a capacitor 67 to the focus voltage tap **53*d*. A relatively large focus load resistance 69 is coupled between ground and the electrode (cathode) of first rectifier 65 remote from capacitor 67. A second rectifier 71 is coupled from the junction of capacitor 67 and rectifier 65 to a point of reference voltage. The reference voltage is provided by means of the combination of a variable resistance 73 coupled in parallel with the screen voltage supply capacitor 63 and a filter capacitor 75 coupled between the variable contact of resistance 73 and ground. The reference voltage supplied to rectifier 71 is developed across capacitor 75 and may be varied by means of resistance 73** which, as will be pointed out below, serves as a focus voltage control.

The focus supply voltage is developed across a focus supply filter capacitor 77 coupled to the junction of rectifier 65 and resistor 69. The focus supply voltage is coupled by means of a resistor 79 to focus electrode 15. A waveform of predetermined shape and duration is provided to capacitor 77 remote from its connection with rectifier 65 to inhibit conduction in rectifier 65 during the first portion and to permit conduction during the latter portion of each deflection retrace interval. The waveform of predetermined shape and duration is provided by means of a resonant circuit comprising the series combination of a capacitor 81 coupled to primary winding **53*a* of transformer 53 and an inductance 83*a* which is returned to ground by means of a damping resistor 85. Further damping means comprising the series combination of a diode 87 and a resistor 89 is coupled across the series combination of inductance 83*a* and resistor 85. Inductance 83*a* is illustrated as a portion of a step-up autotransformer 83, the high voltage terminal of which is coupled to capacitor 77. A further wave shaping capacitor 91 is coupled from the high voltage terminal of autotransformer 83** to ground.

Referring to the voltage waveform diagrams shown in FIGURE 2, the operation of the focus voltage supply of FIGURE 1, FIGURE 2, the operation of the focus voltage supply of FIGURE 1 now will be described. Typically, these waveforms recur at a horizontal line scanning rate of 15,734 Hz. and, furthermore, the retrace portion of each deflection cycle occupies a minor time portion of each cycle (e.g. one-fifth).

In operation, the voltage waveforms which appear across primary winding **53*a* and at the voltage taps 53*d* and 53*e* of horizontal output transformer 53** have different amplitudes but each is substantially of the form shown in FIGURE 2, waveform A.

Voltage waveform A is of a first polarity (e.g. positive with respect to ground) during the retrace portion of each deflection cycle and is of a second, opposite polarity (e.g. negative) during the trace portion of each cycle. The first rectifier 65 is poled for conduction in response to applied voltage of the first polarity (i.e. during retrace) while the second rectifier 71 is poled for conduction in response to applied voltage of the second polarity (i.e., during trace). During trace, rectifier 71 conducts and charges capacitor 67 so as to produce a voltage across capacitor 67 of a polarity tending to forward bias rectifier 65. During retrace, the relatively high voltage, positive polarity, retrace pulses added to the voltage across capacitor 67 to render rectifier 65 conductive at the peaks of the retrace pulses. A unidirectional voltage therefore is developed across resistor 69 which includes a component substantially equal to the peak to peak voltage produced at focus tap **53*d*** by application of the waveform A.

Screen supply rectifier 59, which is coupled to a lower voltage tap **53*e* as compared with focus voltage tap 53*d*, produces a substantially lower unidirectional voltage across capacitor 63 (e.g. 1000 volts screen supply compared to 5000 volts focus supply) for application to the screen electrodes (not shown) of kinescope 13. A selected portion of the voltage produced across capacitor 63 is coupled by means of focus control 73 to capacitor 75. The voltage across capacitor 75, which is of a polarity (positive) to produce forward conduction in rectifier 71, is coupled via rectifier 71 to capacitor 67 and charges capacitor 67 to a voltage tending to forward bias second rectifier 65. That is, the voltage produced across capacitor 75 adds to the peak-to-peak voltage supplied at focus voltage tap 53*d* so as to provide a focus supply voltage across resistor 69 which is substantially equal to the sum of the afore-mentioned peak-to-peak voltage and the voltage across capacitor 75. The component of the focus supply voltage produced across capacitor 75 may be adjusted by means of focus control 73 substantially without affecting the screen supply voltage. Focus control 73** provide an economical means, operating at a relatively low voltage with respect to ground, for varying the relatively high focus supply voltage.

The first rectifier 65 operates as a peak rectifier and normally would conduct at the maximum (e.g. first) peak of waveform A. The relative amplitudes of the first and second peaks of waveform A are dependent upon the beam current drawn by kinescope 13 from the ultor electrode 17 (i.e., from the high voltage supply). The illustrated waveform A typically corresponds to a condition of zero beam current (i.e. minimum brightness on the screen of kinescope 13). An increase in beam current in kinescope 13 produces a decrease in the later or second peak of waveform A as is shown by dotted lines. The first peak of waveform A also may increase for this condition as shown in dotted lines. At the same time, because of the added beam current load on the high voltage supply (rectifier 57 and ultor electrode 17) which has a finite internal impedance, the high voltage supplied to ultor electrode 17 tends to decrease. It is necessary, in order to provide proper focusing of the electron beams in kinescope 13, to decrease the focus supply voltage as beam accelerating (high) voltage decreases. The two voltages similarly must "track" as to increases to maintain proper focus. Changes in the first peak of the flyback pulse are not in the same sense as are changes in high voltage while changes in the second peak are in the same sense as changes in high voltage.

Means are provided for rendering first rectifier 65 responsive to variations in the amplitude of the second half of the applied "saddle-shaped" flyback pulse so as to provide tracking of the focus and beam accelerating voltages. Specifically, capacitor 81 and autotransformer 83 (which includes inductance 83*a*) are employed to provide at the low voltage side of capacitor 77 a voltage having a like polarity during at least the first half of retrace and an opposite polarity during at least a portion of the second half of retrace with respect to the voltage supplied to the anode of first rectifier 65.

A voltage waveform generally similar to waveform A is supplied from primary winding 53*a* to the resonant circuit 81, 83*a*, causing that circuit to ring at its natural oscillation frequency. As is shown in waveform B, a voltage waveform of generally sinusoidal shape is supplied to the low voltage end of capacitor 77 by means of autotransformer 83 during retrace. The effect of this voltage is to increase, during the first half of retrace, the voltage at the cathode of rectifier 65 and thereby maintain rectifier 65 in reverse biased condition. The amplitude and shape of the subtractive voltage is selected such that for all expected variations of beam current, the voltage applied to the anode of rectifier 65 by capacitor 67 is less than the voltage at the cathode thereof (i.e. across resistor 69) throughout the first half of retrace and rectifier 65 only conducts in the second half of retrace. The focus supply voltage therefore responds to variations in the second half of the retrace pulse and tracks with beam accelerating voltage.

Stated differently, the voltage waveform B is arranged to have a maximum positive amplitude greater than the expected maximum difference between the first peak and the trough which occurs at the midpoint of retrace in voltage waveform A. For example, if that maximum difference is 700 volts, waveform B is arranged to have a positive peak value of approximately 1000 volts. The resonant period of the components 81, 83*a* is selected fractionally greater than the deflection retrace interval to insure that rectifier 65 will remain reverse biased until the second half of retrace. Diode 87, resistor 89 and resistor 85 are arranged to provide relatively rapid damping of the ringing in inductance 83*a*.

The invention has been described in terms of a particular circuit configuration utilizing the deflection components described in my above-mentioned U.S. patent application. The invention also may be utilized in various forms and with other deflection circuits. Component values for one configuration compatible with the deflection components described in my earlier application are set forth below.

| | |
|---|---|
| Rectifier **57** | 3CZ3. |
| Rectifier **59** | Simens Type E600C5. |
| Resistor **61** | 10,000 ohms. |
| Capacitor **63** | 0.02 microfarad. |
| Rectifier **65** | Siemens Type TV 6.5. |
| Capacitor **67** | 470 picofarads. |
| Resistor **69** | 66 megohms. |
| Rectifier **71** | Siemens Type TV 6.5. |
| Resistor **73** | 7 megohms (variable). |
| Capacitor **75** | .01 microfarad. |
| Capacitor **77** | 130 picofarads. |
| Resistor **79** | 4.7 megohms. |
| Capacitor **81** | .0012 microfarad. |
| Inductance **83***a* | 10 millihenries. |
| Autotransformer **83** | 5:1 ratio. |
| Resistor **85** | 1,200 ohms. |
| Diode **87** | Type 1N4004. |
| Resistor **89** | 330 ohms. |
| Capacitor **91** | 30 picofarads. |
| Transformer **53**: | |
| Primary **53***a* | 400 volts peak to peak. |
| Tap **53***c* | 30,000 volts peak to peak. |
| Tap **53***d* | 6,000 volts peak to peak. |
| Tap **53***e* | 1,400 volts peak to peak. |

What is claimed is:

1. In a cathode ray tube system, a voltage supply comprising inductive transformer means for producing periodically recurring voltage pulses having predetermined duration, first rectifying means coupled to said transformer means responsive to said voltage pulses for developing a unidirectional voltage, and resonant circuit means for inhibiting conduction in said rectifying means during the first half of said predetermined duration, said resonant circuit means comprising a first capacitor connected to said transformer means and an inductor coupled to said capacitor and to said first rectifying means, said resonant circuit means being characterized by a natural resonant period greater than said predetermined duration of said voltage pulses.

2. A voltage supply according to claim 1 wherein said inductor and said first capacitor are connected in series relation to said transformer means, said inductor being coupled to said rectifying means remote from said transformer means.

3. A voltage supply according to claim 2 and further comprising damping means coupled in circuit with said inductor.

4. A voltage supply according to claim 3 wherein said damping means comprises a diode and a resistance coupled in circuit with said inductor, said diode being poled to conduct following the occurrence of the initial half of said voltage pulses.

5. A voltage supply according to claim 1 wherein said inductive transformer means produces voltage pulses characterized by a saddle-shaped waveform having varying amplitude first and second peaks joined together by a trough, said resonant circuit means providing a substantially sinusoidal voltage waveform having a peak value greater than the difference between said first peak and said trough.

6. In a television receiver, a focus voltage supply comprising a deflection output transformer for producing periodically recurring voltage pulses having predetermined duration, a focus supply capacitor, first rectifying means having a first electrode capacitively coupled to said transformer and a second electrode coupled to said focus supply capacitor for developing a unidirectional focus supply voltage, series resonant circuit means comprising a first capacitor and an inductor coupled in series relation to said transformer, and means for coupling the junction of said first capacitor and said inductor to said second electrode of said rectifying means to inhibit conduction thereof during the first half of said voltage pulses.

7. A focus voltage supply according to claim 6 wherein said series resonant circuit means is arranged to produce a recurring voltage waveform characterized by a fundamental period greater than the duration of said voltage pulses and an amplitude sufficient to inhibit conduction of said rectifying means throughout the first half of said voltage pulses.

8. In a television receiver, a voltage supply comprising:

a deflection output transformer for producing periodically recurring voltage pulses having predetermined duration, wherein said output transformer comprises a plurality of output terminals for producing said voltage pulses at a like plurality of voltage levels, first rectifying means capacitively coupled to a first of said output terminals on said transformer and responsive to said voltage pulses for developing a first unidirectional supply voltage, means for developing a second unidirectional supply voltage less than said first supply voltage, said second means for developing a supply voltage comprises means coupled to a second of said output terminals, and means coupled to said second supply voltage means for selectively coupling at least a portion of said second supply voltage to said first rectifying means to selectively adjust said first supply voltage.

9. A voltage supply means according to claim 8 herein said first rectifying means comprises a first rectifier having anode and cathode electrodes, a coupling capacitor coupled between said first terminal and said anode electrode and a focus supply capacitor coupled between said cathode electrode and a point of reference voltage.

10. A voltage supply according to claim 9 wherein said selective coupling means comprises a second rectifier having an anode electrode coupled to said second supply voltage means and a cathode electrode coupled to said anode of said first rectifier.

11. A voltage supply according to claim 10 wherein said second voltage supply means comprises the series combination of a third rectifier and a filter capacitor coupled between said second terminal and a reference voltage and a variable resistance coupled across said filter capacitor, said variable resistance having a variable contact coupled to said anode of said second rectifier.

12. A voltage supply according to claim 11 and further comprising series resonant circuit means comprising a capacitor and an inductor coupled across a portion of said transformer having a natural resonant period greater than the duration of said voltage pulses, and means for coupling said resonant circuit means to said cathode electrode of said first rectifier.

13. A voltage supply according to claim 12 wherein said last-named coupling means comprises an autotransformer coupled to said focus supply capacitor remote from said cathode of said first rectifier.

14. In a television receiver, a focus voltage supply comprising a deflection output transformer for producing a periodically recurring voltage waveform characterized by relatively short duration pulses of a first polarity and relatively long duration voltage of opposite polarity separating said pulses, focus supply voltage utilization means, a first rectifier having a first electrode capacitively coupled to said transformer and a second electrode coupled to said utilization means for developing a unidirectional supply voltage of said first polarity, and a second rectifier having a first electrode coupled to a reference voltage and a second electrode coupled to said first electrode of said first rectifier, said second rectifier being poled for conduction in response to said voltage of opposite polarity.

15. A voltage supply as defined in claim 14 further comprising means for adjusting the magnitude of said reference voltage to vary said focus supply voltage.

References Cited

UNITED STATES PATENTS

| | | | |
|---|---|---|---|
| 2,783,396 | 2/1957 | Nelson | 315—31 X |
| 3,401,301 | 1/1968 | Swaine et al. | 315—31 |

RODNEY D. BENNETT, Jr., Primary Examiner

J. G. BAXTER, Assistant Examiner

U.S. Cl. X.R.

315—22, 200